United States Patent
Papini

(10) Patent No.: US 10,608,481 B2
(45) Date of Patent: Mar. 31, 2020

(54) CORE OF A TRANSVERSE FLUX MACHINE AND AN ASSOCIATED METHOD THEREOF

(71) Applicant: General Electric Company, Schenectady, NY (US)

(72) Inventor: Francesco Papini, Munich (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 455 days.

(21) Appl. No.: 15/379,557

(22) Filed: Dec. 15, 2016

(65) Prior Publication Data
US 2018/0175678 A1    Jun. 21, 2018

(51) Int. Cl.
*H02K 1/14*    (2006.01)
*H02K 21/12*   (2006.01)

(52) U.S. Cl.
CPC .......... *H02K 1/145* (2013.01); *H02K 21/125* (2013.01); *H02K 2201/12* (2013.01); *Y02E 10/725* (2013.01)

(58) Field of Classification Search
CPC .......... H02K 1/14; H02K 1/141; H02K 1/143; H02K 1/145; H02K 1/146; H02K 1/165; H02K 2201/00; H02K 2201/12; H02K 21/125
USPC ........ 310/156.02, 156.07, 216.004, 216.017, 310/216.016, 216.061, 216.023, 310/216.024–216.059
See application file for complete search history.

(56) References Cited

U.S. PATENT DOCUMENTS

| | | | |
|---|---|---|---|
| 5,854,521 A | 12/1998 | Nolle | |
| 7,312,549 B2 | 12/2007 | Rasmussen | |
| 8,994,243 B2 | 3/2015 | Calley et al. | |
| 2004/0207281 A1* | 10/2004 | Detela | H02K 11/01 310/162 |
| 2011/0169365 A1* | 7/2011 | Calley | H02K 21/125 310/156.02 |
| 2014/0265714 A1 | 9/2014 | Meyer | |
| 2015/0115749 A1 | 4/2015 | Dial et al. | |

FOREIGN PATENT DOCUMENTS

| | | |
|---|---|---|
| CN | 102522870 B | 7/2014 |
| JP | 2013013304 A | 1/2013 |

(Continued)

OTHER PUBLICATIONS

Gartner et al., "Laminated circumferential transverse flux machines—lamination concept and applicability to electrical vehicles", 2011 IEEE International Electric Machines & Drives Conference (IEMDC), pp. 831-837, May 15-18, 2011, Niagara Falls, ON.

(Continued)

*Primary Examiner* — Nguyen Tran
(74) *Attorney, Agent, or Firm* — Armstrong Teasdale LLP

(57) ABSTRACT

A core of a transverse flux machine a stator pole. The stator pole includes a plurality of laminations, where laminations of the plurality of laminations are in a stacked configuration. Further, each of the plurality of laminations includes at least one of a magnetic region and a non-magnetic region, where individual shapes of magnetic regions of the plurality of laminations are such that the magnetic regions of the plurality of laminations at least a portion of a three-dimensional magnetic circuit.

16 Claims, 6 Drawing Sheets

(56) References Cited

FOREIGN PATENT DOCUMENTS

| WO | 2011103869 A2 | 9/2011 |
| WO | 2012073388 A1 | 6/2012 |

OTHER PUBLICATIONS

Seibold et al., "Design and measurement of a laminated permanent magnet excited transverse flux machine for electrical vehicles", Electric Drives Production Conference (EDPC), 2014 4th International, pp. 1-6, Sep. 30-Oct. 1, 2014, Nuremberg.

Jia et al., "A novel transverse-flux Pm linear machine with double ??-hoop stator", 2015 IEEE International Conference on Applied Superconductivity and Electromagnetic Devices (ASEMD), pp. 615-616, Nov. 20-23, 2015, Shanghai.

\* cited by examiner

CORE OF A TRANSVERSE FLUX MACHINE AND AN ASSOCIATED METHOD THEREOF

BACKGROUND

Embodiments of the present disclosure generally relate to transverse flux machines. Particularly, the present disclosure relates to transverse flux machines using lamination sheets.

Typically, transverse flux machines are configured to achieve very high torque density with respect to weight of machine. The high torque density enables the use of transverse flux machines for applications, such as but not limited to, hybrid electrical vehicles and wind turbines.

Contemporary transverse flux machines employ a three-dimensional (3D) magnetic circuit. Disadvantageously, use of the 3D magnetic circuit in the transverse flux machines does not allow the use of simple lamination sheets, which are otherwise feasible for machines having two-dimensional (2D) magnetic circuits.

Furthermore, stator poles of the transverse flux machines have a non-planar configuration. Due to the non-planar configuration of the stator poles, machining of the stator poles of the transverse flux machines is complicated. Therefore, typically, the transverse flux machines are made of iron powder or other soft magnetic components that can be easily machined. However, the use of iron powder or other soft magnetic components increases the cost of the transverse flux machines. In addition, the use of iron powder or other soft magnetic components results in structures that are mechanically weak.

Certain transverse flux machines constructed using conventional laminations have been proposed in recent times. However, the transverse flux machines made of these laminations have non-planar stator poles. The design and structure of the non-planar stator poles affect structural strength of the transverse flux machine.

BRIEF DESCRIPTION

In accordance with aspects of the present specification, a core of a transverse flux machine includes a stator pole. The stator pole includes a plurality of laminations, where laminations of the plurality of laminations are in a stacked configuration. Further, each of the plurality of laminations includes at least one of a magnetic region and a non-magnetic region. Moreover, where individual shapes of magnetic regions of the plurality of laminations are such that the magnetic regions of the plurality of laminations form at least a portion of a three-dimensional magnetic circuit.

In accordance with another aspect of the present specification, a transverse flux machine includes a rotor, a core, and a stator pole operatively coupled to the rotor, where the stator pole includes a plurality of laminations. Further, laminations of the plurality of laminations are in a stacked configuration, where each of the plurality of laminations includes at least one of a magnetic region and a non-magnetic region. Moreover, individual shapes of magnetic regions of the plurality of laminations are such that the magnetic regions of the plurality of laminations form at least a portion of a three-dimensional magnetic circuit. The transverse flux machine further includes a stator coil operatively coupled to the rotor and the stator pole.

In accordance with yet another aspect of the present specification, a method of manufacturing a transverse flux machine is presented. The method includes defining at least one of a first region and a second region in each lamination of a plurality of laminations. Further, the method includes forming magnetic regions in one or more laminations of the plurality of laminations by masking first regions of the one or more laminations of the plurality of laminations. Also, the method includes forming non-magnetic regions in one or more laminations of the plurality of laminations by modifying magnetic properties of second regions of the one or more laminations of the plurality of laminations. The method also includes stacking the plurality of laminations to form a stacked configuration, where the stacked configuration is a stator pole, where the stator pole is operatively coupled to a rotor and a stator coil, and where individual shapes of magnetic regions of the plurality of laminations are such that the magnetic regions of the plurality of laminations form at least a portion of a three-dimensional magnetic circuit.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. The term "operatively coupled" as used herein may be used to refer to a magnetic coupling, an electrical coupling, a communicative coupling, and the like. Furthermore, the terms "circuit" and "circuitry" and "controller" may include either a single component or a plurality of components, which are either active and/or passive and are connected or otherwise coupled together to provide the described function.

As will be described in detail hereinafter, various embodiments of a core of a transverse flux machine and a method of manufacture of the core of the transverse flux machine are presented. Advantageously, the transverse flux machine having the core of the present specification has a less complex design. In certain embodiments, the core of the transverse flux machine includes a plurality of laminations. The plurality of laminations enables easier manufacturing of the design of a magnetically three-dimensional core of the transverse flux machine as compared to conventionally utilized cores. Further, using the laminations allows the use of desirable and cost-effective materials for making the core. By way of example, the plurality of laminations may be made of conventional materials, such as iron-based materials, nickel based materials and cobalt based materials, having dual magnetic properties to facilitate desirable functionalities of the core of the transverse flux machine. Further, the core of the transverse flux machine and the transverse flux machine as described herein have enhanced mechanical strength due to use of the laminations and the material of the laminations, and the like. According to aspects of the present specification, design, manufacturing, and assembly of the core and the transverse flux machine enables a cost effective and easier manufacturability as compared to conventional transverse flux machines.

Figure 1:
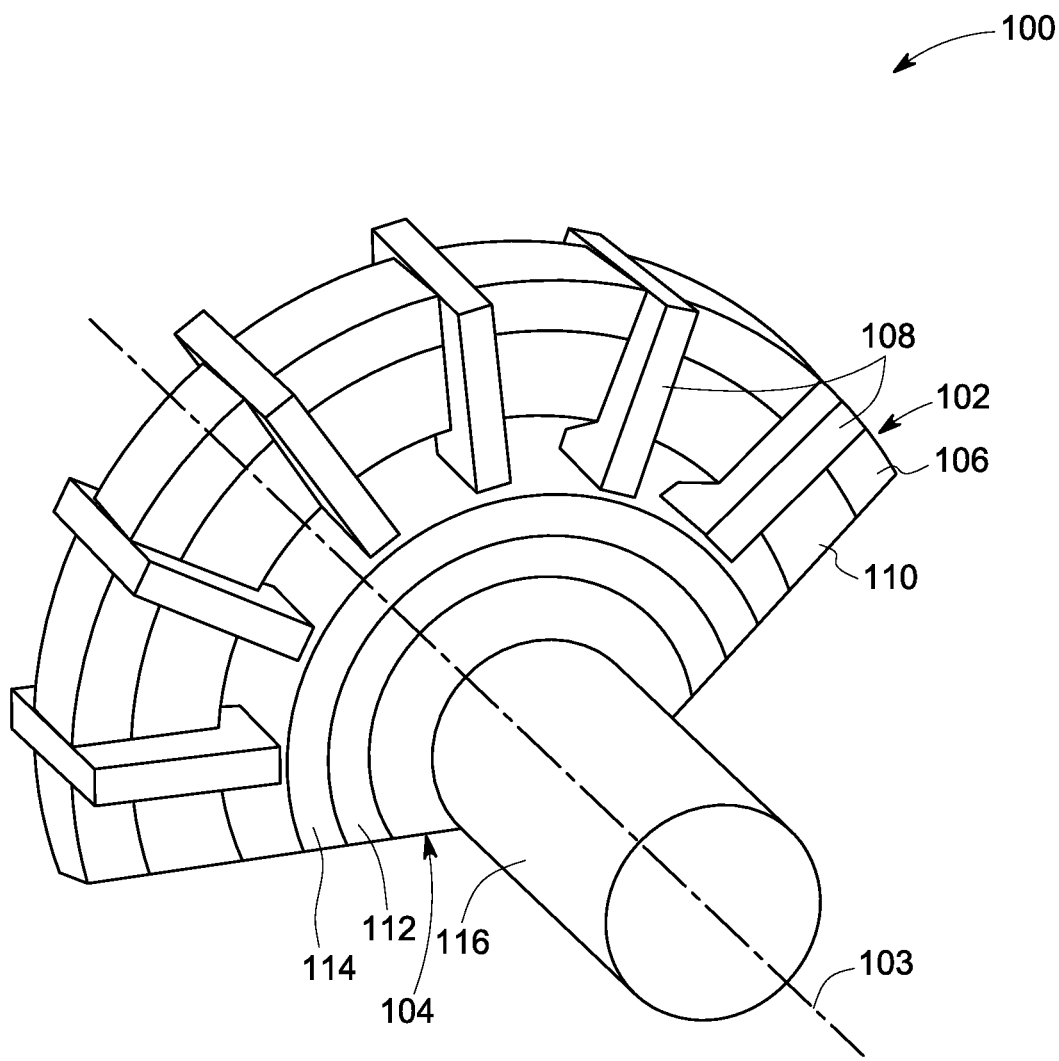
FIG. 1 is a diagrammatical representation of a phase of a transverse flux machine, where the phase of the transverse flux machine includes at least a portion of a core of the transverse flux machine, according to aspects of the present specification.

Turning now to FIG. 1, a diagrammatical representation of a single phase of a transverse flux machine 100 is presented. The transverse flux machine 100 includes a stator 102 operatively coupled to a rotor 104. The stator 102 includes a support structure 106, a plurality of stator poles 108, and a stator coil 110. The stator poles 108 comprise planar surfaces, and hence may be referred to as "planar stator poles." In one embodiment, the support structure 106 is a frame like structure configured to provide support to the stator poles 108. In a non-limiting embodiment, the support structure 106 may be a circular structure. In one embodiment, the stator poles 108 may be disposed along an outer circumference of the support structure 106. In such embodiments, the stator poles 108 are operatively coupled to the stator coil 110, and each stator pole 108 surrounds at least a portion of the stator coil 110. In one example, each stator pole 108 surrounds about 80% or more of the cross-sectional area of the stator coil 110 at a particular location along the outer circumference of the support structure 106 (e.g., such as a partial or full sleeve).

As will be described in detail with respect to FIGS. 2-7, the stator pole 108 of the present specification includes a plurality of laminations arranged in a stacked configuration. Laminations of the plurality of laminations of the stacked configuration are similarly shaped. As used herein, the term "similarly shaped" entails laminations that have similar dimensions, shapes, sizes, lengths, circumferences, or combinations thereof. In one embodiment, the similarly shaped laminations include C-shaped laminations, U-shaped laminations, and the like. Specifically, each of the laminations are shaped to define an opening that receives at least a portion of a stator coil. In one specific embodiment, the plurality of laminations have the same or similar shape, size, and dimensions.

Further, each lamination of the plurality of laminations includes at least one of a magnetic region and a non-magnetic region. The term "magnetic region" as used herein refers to a region of lamination which has a magnetic property. In particular, the magnetic region of the lamination has a high relative permeability, which enables the magnetic region to allow flow of magnetic flux. As used herein, the term "relative permeability" is a ratio of an effective permeability and an absolute permeability of the magnetic region. In one embodiment, a value of the relative permeability of the magnetic region may be greater than a threshold value. Further, a value of the relative permeability of the non-magnetic region is equal to or lower than the threshold value. In particular, regions having a relative permeability greater than the threshold value allow flow of magnetic flux, and are referred to as magnetic regions. Further, regions having a relative permeability lower than the threshold value do not allow flow of magnetic flux, and are referred to as non-magnetic regions. Specifically, the non-magnetic regions in a lamination of the plurality of laminations is configured to reduce or prevent flow of magnetic flux. In one example, the threshold value may be 100. In another example, the threshold value may be greater than 200. In one embodiment, the magnetic property of a region of a lamination may be modified to create a non-magnetic region, such that the non-magnetic region has a relative permeability equal to or below the threshold value. In some embodiments, the relative permeability of the non-magnetic region is about 1.

Further, in one stator pole 108, a shape of a magnetic region, a non-magnetic region, or both the magnetic and non-magnetic regions of at least one lamination of the plurality of laminations is substantially different from a shape of a magnetic region, a non-magnetic region, of both the magnetic and non-magnetic regions of other laminations of the plurality of laminations. Also, the magnetic and non-magnetic regions in a lamination of the plurality of laminations are operatively coupled to one another. The structure of the stator pole and the laminations is described in greater detail with respect to FIGS. 2-7.

In certain embodiments, the rotor 104 includes a rotor yoke 112, an array 114 of permanent magnets (not shown in FIG. 1), and a rotor shaft 116. In one embodiment, the rotor yoke 112 and the array 114 of the permanent magnets are disposed in a co-axial manner. North and south poles of each permanent magnet of the array 114 are disposed in two individual rows. Further, the north and south poles of each permanent magnet of the array 114 are axially and tangentially shifted with respect to north and south poles of other permanent magnets of the array 114. In some embodiments, the rotor yoke 112 and the array 114 of the permanent magnets are co-axial cylindrical structures. In some of these embodiments, the rotor yoke 112 forms an inner cylinder of the cylindrical structure. Further, in one embodiment, the stator 102 is disposed coaxially with respect to the rotor 104. In such an embodiment, the stator poles 108 may be disposed about an outer circumference of the rotor 104. The magnetic and non-magnetic regions of laminations of the plurality of laminations are stacked such that an arrangement of the stator 102 with respect to the rotor 104 forms a three-dimensional (3D) magnetic circuit.

The magnetically conducting portion of the transverse flux machine 100 may be referred to as a core. In particular, the stator poles 108 and the array 114 of permanent magnets form a core of the transverse flux machine 100. The arrangement of the stator 108 and rotor 104 and the 3D magnetic circuit will be described in detail with respect to FIG. 7.

Furthermore, the process of manufacturing of the transverse flux machine will be described in detail with respect to FIG. 8.

Although the illustrated embodiment depicts a single phase of the transverse flux machine, it may be noted that the transverse flux machine 100 may include multiple phases. The multiple phases of the transverse flux machine 100 are co-axial with a rotor and are disposed in series along the axis 103 of the rotor shaft 116. Further, each phase of the transverse flux machine 100 is shifted from other phases in a tangential direction by respective angles such that laminated stator poles of the different phases are not aligned with each other.

Figure 2:
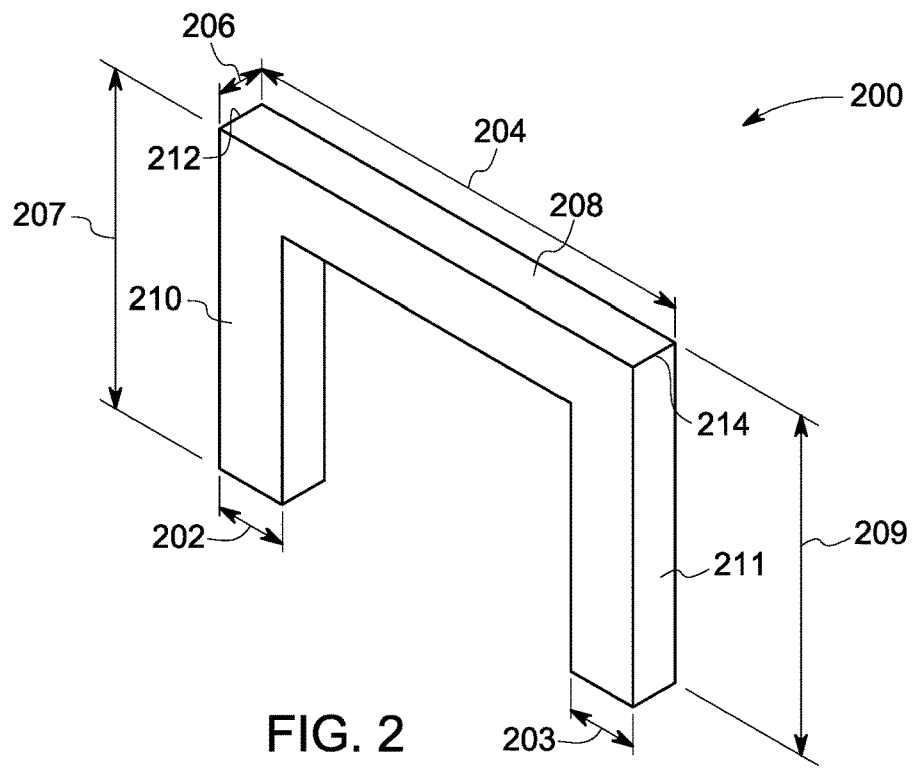
FIGS. 2-3 are diagrammatical representations of different embodiments of a lamination for use in the transverse flux machine of FIG. 1, according to aspects of the present specification.
Figure 3:
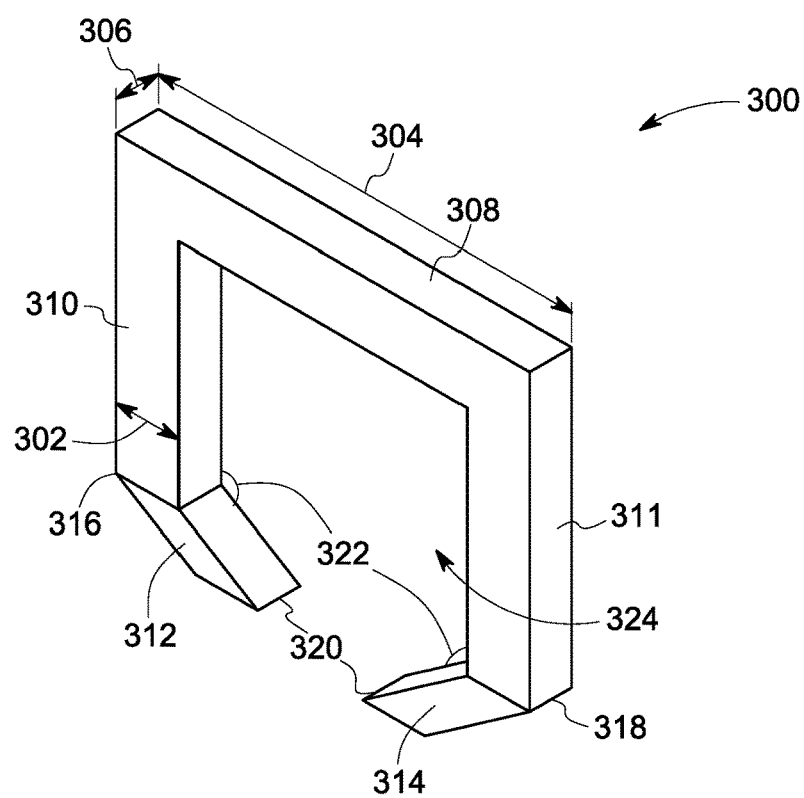

FIGS. 2-3 are diagrammatical representations of different embodiments of laminations of a plurality of laminations of a stator pole, such as the stator pole 108 of a core, such as the core of the transverse flux machine 100 of FIG. 1. In particular, FIG. 2 represents an exemplary lamination 200 of a plurality of laminations for use in the stator pole 108 of the core of the transverse flux machine 100. The lamination 200 includes a leg 210 coupled to a leg 211 using a connecting segment 208. In one example, the legs 210, 211 and the connecting segment 208 may not be physically distinct structures. By way of example, the lamination 200 may be formed by separating out a portion of a sheet of the lamination 200 to define the legs 210, 211 and the connecting segment 208.

Widths of the legs 210 and 211 are represented by reference numerals 202 and 203, respectively. Further, a width of the connecting segment 208 is represented by reference numeral 204. Lengths of the legs 210, 211 are represented by reference numerals 207 and 209, respectively. Further, a thickness of the lamination 200 is represented by reference numeral 206. The dimensions 202, 203, 210, 211, and 206 of the lamination 200 are selected based on desired dimensions of the stator poles 108 and on an amount of a magnetic flux that may be carried by the stator pole 108 during operation of the transverse flux machine 100. Further, the dimensions 202, 203, 210, 211, and 206 of the lamination 200 may vary proportionately based on a size of the stator coil, such as the stator coil 110 of FIG. 1.

A shape of the lamination 200 may be selected based on a shape of the support structure 106 and the stator coils 110. Laminations of the plurality of laminations may have similar shapes. By way of example, the laminations may have the same shape as that of the lamination 200. The laminations 200 may be shaped as a U-shaped lamination or a C-shaped lamination.

It may be noted that the widths 202, 203 of the legs 210, 211 may or may not be same. Further, it may be noted that the lengths 207, 209 of the legs 210, 211 may or may not be same. Further, in the thickness 206 of the lamination 200 may or may not be uniform across the width 204 of the lamination 200. For example, the thickness 206 of the connecting segment 208 may gradually increase or decrease along the width 204 of the lamination 200 or the thickness 206 of the connecting segment 208. In some embodiments, the thickness 206 may or may not be same for different laminations of a plurality of laminations of the stator pole 108. In some embodiments, the thickness 206 of the lamination 200 is in a range from about 0.1 millimeter (mm) to about 0.5 mm. In one embodiment, the ferromagnetic material includes iron based material, nickel based material, cobalt based material, or the like.

FIG. 3 represents another exemplary lamination 300 for use in a stator pole of the transverse flux machine, such as the transverse flux machine 100. The lamination 300 includes two legs 310 and 311, a connecting segment 308 disposed between the two legs 310 and 311, and two protruding portions 312 and 314. In the illustrated embodiment, the two legs 310 and 311 are substantially perpendicular to the connecting segment 308, however, in alternative embodiments, the legs 310 and 311 may be at other angles with respect to the connecting segment 308 based on a shape of the connecting segment 308, a shape or cross-section of a corresponding support structure, a shape or cross-section of a corresponding stator coil, and the like. Further, the protruding portion 312 extends inward from the end 316 of the leg 310 and the protruding portion 314 extends inward from the end 318 of the leg 311. In one embodiment, an angle 322 may be formed between the protruding portion 312 and the leg 310. In one embodiment, the angle 322 may be in a range from about 80 degrees to about 180 degrees. Moreover, in one embodiment, the ends 320 of the two protruding portions 312, 314 are at a predetermined distance from each other. Dimensions and the angle 322 of the protruding portions 312, 314 are based on dimensions of the desired stator coil that the opening 324 is configured to receive.

Figure 4:
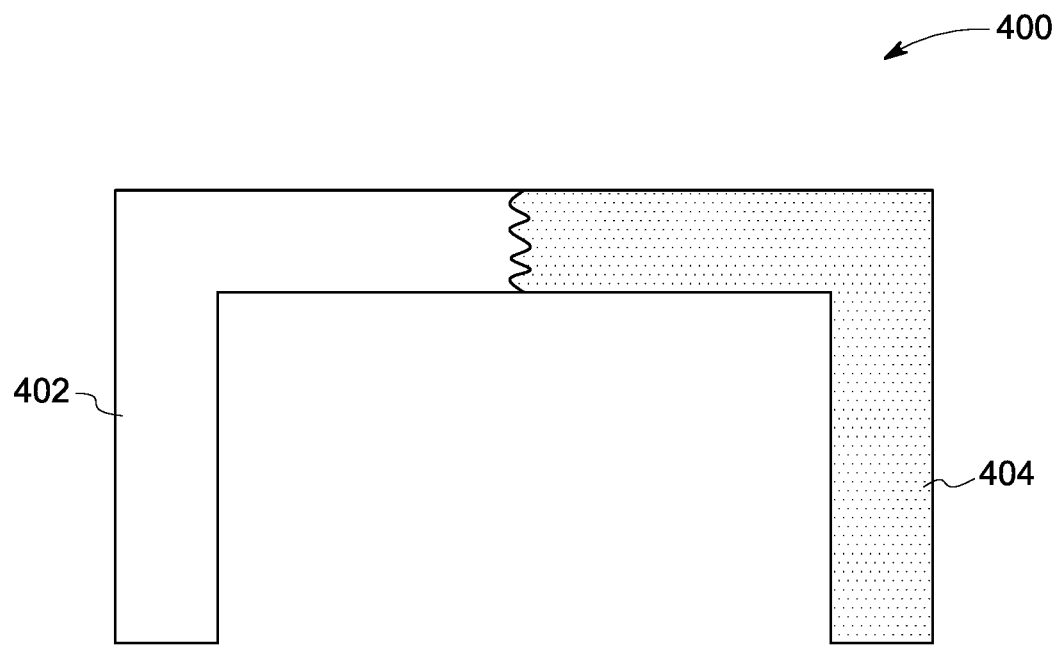
FIGS. 4-5 are diagrammatical representations of front views of different embodiments of a lamination having a first region and a second region for use in the transverse flux machine of FIG. 1, according to aspects of the present specification.
Figure 5:
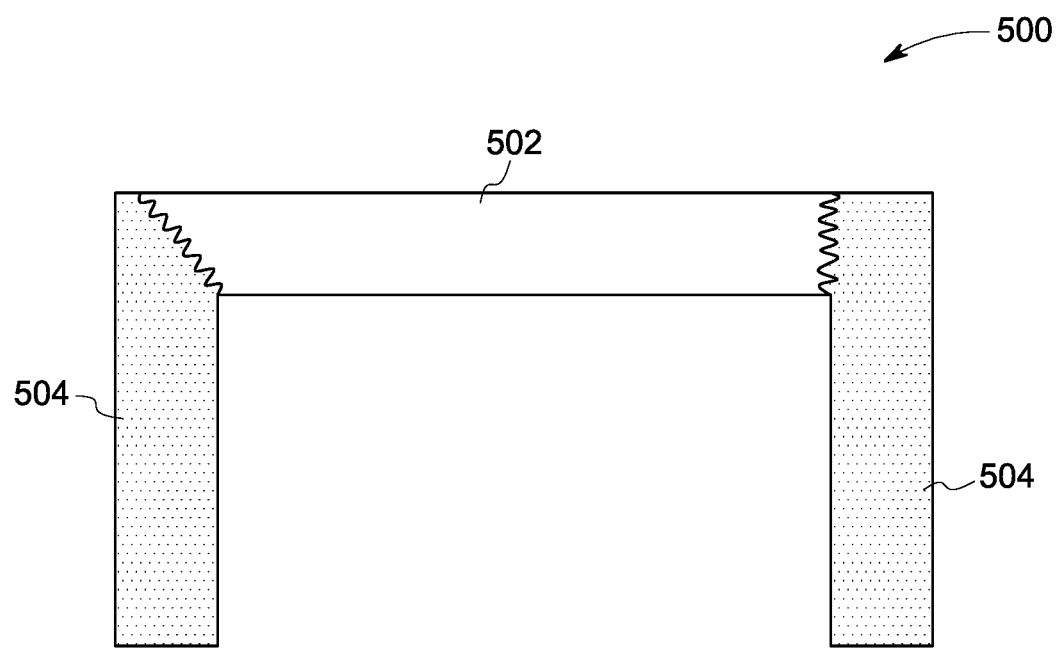

FIGS. 4-5 are diagrammatical representations of front views of similar shaped laminations 400 and 500 having different shapes of magnetic and non-magnetic regions. In particular, regions 402 and 502 represent magnetic regions of the laminations 400 and 500, respectively, while regions 404 and 504 represent non-magnetic regions of the laminations 400 and 500, respectively. It should be noted that the difference in appearance of the magnetic and non-magnetic regions is for illustrative purposes, the magnetic and non-magnetic regions may or may not appear different to a naked eye. In one embodiment, the laminations 400 and 500 represented in FIGS. 4 and 5, respectively may be employed in the same stacked configuration (not shown in FIGS. 4-5) of a plurality of laminations to form a stator pole, such as the stator pole 108 of FIG. 1, of the core, such as the core of the transverse flux machine, such as the transverse flux machine 100 of FIG. 1. The laminations 400 and 500 may or may not be adjacently disposed in the stacked configuration of the plurality of laminations. The magnetic regions 402 and 502, and the non-magnetic regions 404 and 504 contribute to a 3D magnetic circuit formed in the stacked configuration.

The magnetic regions 402 and 502 have relative permeabilities greater than a threshold value, thereby allowing flow of magnetic flux. Alternatively, in some embodiments, the regions represented by reference numerals 402 and 502 are non-magnetic regions, and the regions represented by reference numerals 404 and 504 are magnetic regions.

In certain embodiments, in a stacked configuration (not shown in FIGS. 4-5) of laminations having the laminations 400 and 500, one or more laminations having same dimensions as the laminations 400 and 500 may be disposed between the laminations 400 and 500. These laminations disposed between the laminations 400 and 500 along with the laminations 400 and 500 may have magnetic and non-magnetic regions having different shapes than the shapes of the magnetic and non-magnetic regions illustrated in FIGS. 4-5. By way of example, the shape of the magnetic regions from the lamination 400 to the lamination 500 may change gradually over the various laminations disposed between the laminations 400 and 500, such that the magnetic regions present in the laminations 400 and 500 as well as the laminations disposed between the laminations 400 and 500 form at least a portion of the 3D magnetic circuit of that stacked configuration.

Advantageously, use of laminations, such as the laminations 200, 300, 400, and 500 of FIGS. 2-5 in a stator pole, such as the stator pole 108 of FIG. 1, reduces iron losses induced in the core during operation of the transverse flux machine, such as the machine 100 of FIG. 1. Further, reduction in the iron losses induced in the core results in enhanced efficiency of the transverse flux machine, such as the machine 100 of FIG. 1. Further, although the examples of FIGS. 2-5 represent a C-shaped lamination, other shapes of laminations are also envisioned within the purview of present specification. Non-limiting examples of such shapes may include a U-shape, a semi-circular shape, a parabolic shape, and the like.

Further, the stator pole, such as the stator pole 108, made using the stacked configuration of the planar laminations is a planar stator pole. The planar stator poles have higher structural strength as compared to conventionally used non-planar stator poles. The planar stator pole of the present specification is relatively easier to manufacture as compared to conventional non-planar stator poles that require expensive and time consuming machining processes. In addition, ease of manufacturing allows broader range of materials to be used to make the laminations. Accordingly, suitable materials, such as iron based alloys may be used to make the laminations. Advantageously, the present specification provides the ability to form non-planar 3D magnetic circuit while employing planar laminations.

Figure 6:
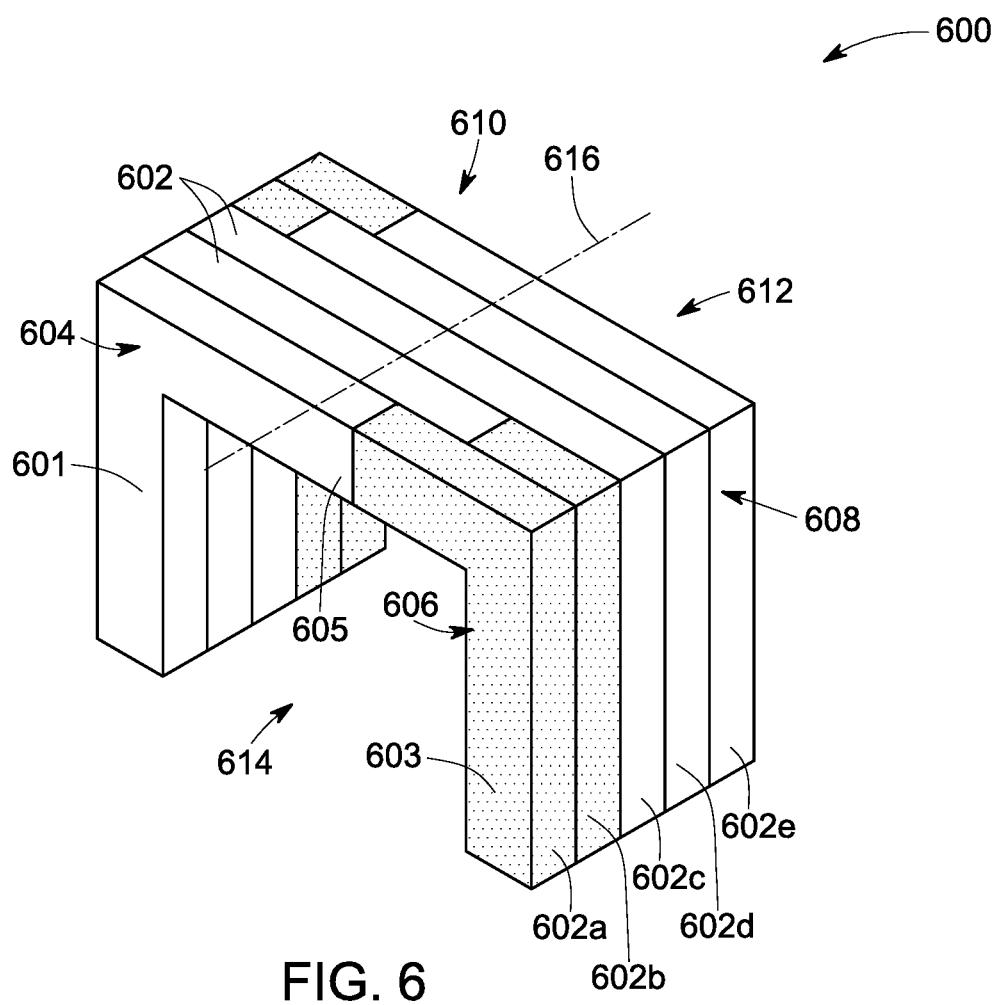
FIG. 6 is a diagrammatical representation of a stacked configuration of laminations for use in the transverse flux machine of FIG. 1, according to aspects of the present specification.

FIG. 6 represents an embodiment of a stacked configuration 600 of a plurality of laminations for use in a stator pole, such as a stator pole 108, of a transverse flux machine, such as the transverse flux machine 100 of FIG. 1. The stacked configuration 600 includes a plurality of laminations 602. Further, each lamination 602 of the plurality of laminations 602 includes a pair of legs 601, 603 and a connecting segment 605 connecting the legs 601 and 603. In the stacked configuration 600, the plurality of laminations 602 are stacked such that corresponding parts of the plurality of laminations 602 are aligned with respect to one another. By way of example, legs 601 and 603 of one lamination 602 are aligned with the legs 601 and 603, of adjacently disposed laminations 602, and the connecting segment 605 of one lamination 602 is aligned with the connecting segment 605 of adjacently disposed laminations 602.

The laminations 602 are stacked to define an opening 614 in the stacked configuration 600. In particular, the opening 614 is disposed between legs 601 and 603 of the pairs of legs 601, 603 of the plurality of laminations 602. The opening 614 is configured to receive at least a portion of a stator coil (not shown in FIG. 6). Accordingly, a shape and dimensions of the opening 614 correspond to a shape and dimensions of the stator coil.

In certain embodiments, the laminations 602 of the stacked configuration 600 may be coupled to one another using a coupling element, such as, but not limited to, mechanical fasteners, adhesive materials, or both. Non-limiting examples of the mechanical fasteners may include wires, screws, clips, rivets, compression plates, and the like. In certain other embodiments, the laminations 602 of the stacked configuration 600 may be coupled to one another by welding. In some embodiments, each lamination 602 includes a coupling feature, where the coupling feature of one lamination 602 is configured to interlock with a corresponding coupling feature of other adjacently disposed laminations 602.

Furthermore, each of the laminations 602 includes at least one of a magnetic region 604 and a non-magnetic region 606. In some embodiments, one or more laminations 602 may only have a magnetic region 604. Additionally, or alternatively, one or more other laminations 602 may only have a non-magnetic region 606. Further, various laminations 602 of the stacked configuration 600 may include one or more magnetic regions 604 having different shapes. Additionally, or alternatively, shapes of one or more of the non-magnetic regions 606 may vary between different laminations 602.

In the stacked configuration 600, shapes of the magnetic and non-magnetic regions 604 and 606 in the laminations 602 gradually change between end laminations 602a and 602e such that the magnetic regions 604 of the various laminations 602 in the resultant stacked configuration 600 define at least a portion of 3D magnetic circuit. In particular, the laminations 602 are stacked such that the magnetic regions 604 of the laminations 602 are arranged with respect to one another to define a magnetically conducting portion 608 of the stator pole. More particularly, the first lamination 602a includes the magnetic and non-magnetic regions 604, 606 defined such that the leg 603 and a portion of the connecting segment 605 proximate the leg 603 form a non-magnetic region 606 and the remaining portion of the connecting segment 605 and the leg 601 form a magnetic region 604. The second lamination 602b disposed adjacent to the lamination 602a includes the magnetic and non-magnetic regions 604, 606 defined such that the leg 603 and a portion of the connecting segment 605 proximate the leg 603 form a non-magnetic region 606. As depicted in FIG. 6, the third lamination 602c includes only magnetic region 604.

Furthermore, the fourth lamination 602d includes the magnetic and non-magnetic regions 604, 606 defined such that the leg 601 and a portion of the connecting segment 605 proximate the leg 601 form a non-magnetic region 606. The remaining portion of the connecting segment 605 and the leg 603 of the fourth lamination 602d is a magnetic region 604. Also, the fifth lamination 602e includes the magnetic and non-magnetic regions 604, 606 defined such that a portion of the leg 601 and the connecting segment 605 proximate the leg 601 define a non-magnetic region 606. Also, the remaining portion of the connecting segment 605 and the leg 603 of the lamination 602e is a magnetic region 604.

In an alternative embodiment, the first lamination 602a includes the magnetic and non-magnetic regions 604, 606 defined such that a portion of the connecting segment 605 proximate to the leg 601 and the leg 601 is a non-magnetic region 606 and the remaining portion of the connecting segment 605 and the leg 603 is a magnetic region 604. In such an embodiment, the last lamination 602e has the magnetic and non-magnetic regions 604, 606 defined such that a portion of the connecting segment 605 proximate to the leg 603 and the leg 603 is a non-magnetic region 606 and the remaining portion of the connecting segment 605 and the leg 601 is a magnetic region 604.

Further, the laminations 602a-602e are stacked such that the magnetic regions 604 of the laminations 602a-602e define the magnetically conducting portion 608 of the stator pole. In particular, the laminations 602 having different shapes of the magnetic and non-magnetic regions 604 and 606 are disposed adjacently to form at least a portion of the 3D magnetic circuit. In operation, the shape of the magnetically conducting portion 608 forms a part of the 3D magnetic circuit that provides a path for the magnetic flux to flow.

Additionally, the magnetically conducting portion 608 is not symmetrical about a center line 616 of the connection segments 605. In particular, portions 610 and 612 of the stacked configuration 600 disposed on either side of the center line 616 are not mirror images of one another. In particular, the magnetically conducting portion 608 in the first portion 610 is not aligned with respect to the magnetically conducting portion 608 in the second portion 612. A shape of the magnetically conducting portion 608 is based on shapes of individual magnetic regions 604 of laminations 602a-602e. In particular, individual magnetic regions 604 collectively form the 3D shape of the magnetically conducting portion 608. Hence, each individual magnetic region 604 of different laminations 602 may be designed separately and subsequently, the laminations 602 arranged to form the 3D magnetically conducting portion 608. As a result, advanced machining processes that are typically expensive and time consuming are not required to form the 3D shape of the magnetically conducting portion 608 in the stacked configuration 600 from the laminations 602.

Although the illustrated embodiment of FIG. 6 depicts the stacked configuration 600 as having 5 laminations, it should be noted that the stacked configuration may have fewer or more number of laminations based on the desirable magnetic flux and the 3D magnetic circuit.

Figure 7:
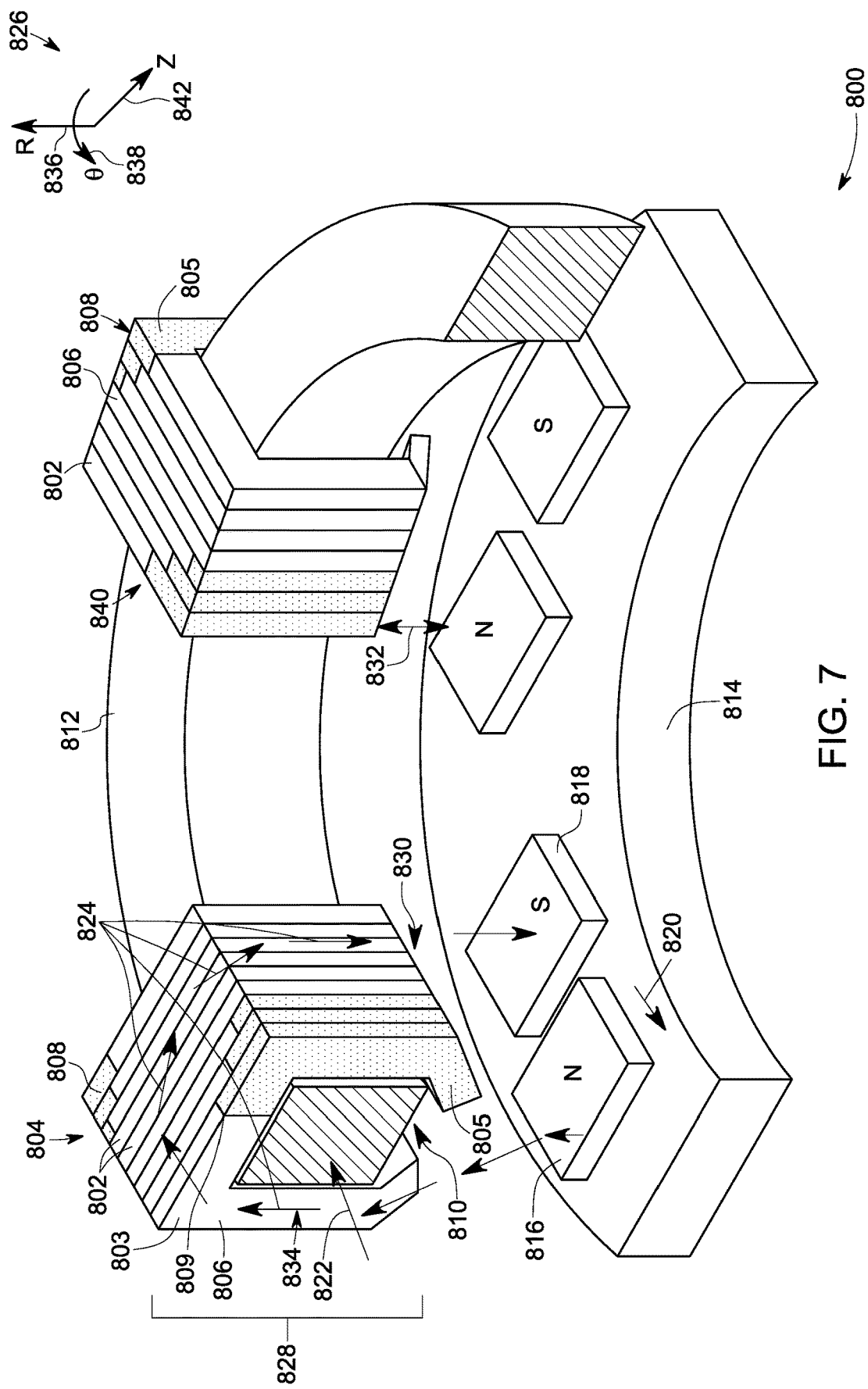
FIG. 7 is a diagrammatical representation of an example portion of the transverse flux machine, according to aspects of the present specification.

FIG. 7 is a diagrammatical representation of an example portion of the transverse flux machine, according to aspects of the present specification. In particular, FIG. 7 represents a portion of a core 800 of the transverse flux machine. The illustrated portion of the core 800 includes stator poles 804 and 840. The stator poles 804 and 840 are planar stator poles. In accordance with aspects of the present specification, each of the stator poles 804 and 840 includes a plurality of laminations 802. The plurality of laminations 802 may include similarly shaped laminations. In one embodiment, the laminations 802 may be C-shaped laminations, U-shaped laminations, or the like. Each of the laminations 802 may include a magnetic region 803 and a non-magnetic region 805. A boundary between the magnetic and non-magnetic regions 803 and 805 is represented by reference numeral 809. In the example of FIG. 7, the magnetic region 803 is defined by a value of relative permeability that is greater than a threshold value. Further, a value of relative permeability of the non-magnetic region 805 is equal to or lower than the threshold value.

Additionally, shapes of the magnetic and non-magnetic regions 803, 805 of each of the laminations 802 contribute to the shape of the magnetically conducting portion 806 of each stator pole, such as the stator poles 804 and 840, of the transverse flux machine. Consequently, the magnetically conducting portions 806 of the stator poles 804 and 840 together with magnetically conductive portions of other stator poles of the core 800 define a 3D magnetic circuit 834 of the core 800.

Shapes of the magnetic regions and non-magnetic regions 803, 805 of the laminations 802 are selected based on desired shapes of the magnetically conducting portions 806 and the magnetically non-conducting portions 808 of the stator poles 804 and 840. The desired shape of the magnetically conducting portions 806 and the magnetically non-conducting portions 808 of the stator poles 804 and 840 may be determined based on the 3D magnetic circuit 834.

In the example of FIG. 7, the stator poles 804, 840 have a C-shaped structure. In one embodiment, magnetically conducting portion 806 is defined in a hollow parallelepiped shape in the stator poles 804, 840, in a similar manner as the magnetically conducting portion 608 of FIG. 6.

Further, an opening 810 is defined in the stator poles 804, 840. The opening 810 is configured to receive a stator coil 812. The stator coil 812 is configured to energize the stator poles 804 and 840. In one embodiment, the stator coil 812 may be made of materials, such as copper, aluminum, or the like. The stator coil 812 includes a ring like structure. A combination of the stator poles 804, 840 and the stator coil 812 forms a stator 828. Reference numeral 830 represents an inner radius of the stator 828. Although the example of FIG. 7 depicts only two stator poles 804, 840, multiple stator poles may be disposed substantially equidistant from each other along the stator coil 812.

The core 800 includes an array 814 of permanent magnets. North and south poles of each permanent magnet of the array 814 are disposed in individual rows. Further, the north and south poles of each permanent magnet of the array 814 are axially and tangentially shifted with respect to north and south poles of other permanent magnets of the array 814. The term 'north pole,' as used herein, may be used to refer to a pole, where the direction of magnetization of the pole points outwards from the magnet's surface. An opposite end of the north pole 816 is referred to as a south pole 818. The array 814 of permanent magnets forms a part of a rotor of the core 800. Although the example of FIG. 7 describes an embodiment of a rotor having an array of permanent magnets, use of other embodiments of rotors is also envisaged.

Arrow 820 represents the direction of rotation of the rotor. Further, arrow 822 represents the direction of current flow through the stator coil 812 at a particular instant in time. Since the stator coil 812 is a ring like structure, the current flowing through the stator coil 812 follows a substantially circular path. Accordingly, when the current flows through the stator coil 812 in the direction shown by arrow 822, a magnetic flux 824 is generated in a clockwise direction around the stator coil 812. In particular, the magnetic flux 824 flows through the stator pole 804. Although in the example of FIG. 7, two stator poles 804, 840 are represented, for ease of explanation, the flow of magnetic flux 824 is explained with respect to only one stator pole, stator pole 804. Reference numeral 826 represents the orientation of R-axis, θ-axis, and z-axis. Reference numeral 836 represents R-axis, reference numeral 838 represents θ-axis, and reference numeral 842 represents z-axis.

As noted hereinabove, the magnetically conducting portion 806 of the stator pole 804 has a value of relative permeability greater than a threshold value and the magnetically non-conducting portion 808 of the stator pole 804 has a value of relative permeability equal to or lower than the threshold value. In one example, the threshold value is 100. Furthermore, it may be noted that the relative permeability of air is equal to 1. Due to higher relative permeability of the magnetically conducting portion 806 of the stator pole 804, in operation, the magnetic flux 824 flows through the magnetically conducting portion 806 and not through the magnetically non-conducting portion 808 or air. Further the magnetically conducting portion 806 of the stator pole 804 provides a 3D space for the magnetic flux 824 to flow. Further, in operation, the magnetic flux 824 flows towards the inner radius 830 of the stator 828. At the inner radius 830, the magnetic flux 824 flows through one end of the stator pole 804, crosses airgap 832, and flows into the array 814 of permanent magnets. In particular, the magnetic flux 824 flows into the south pole 818 of the array 814 of permanent magnets along R-axis. Further, the magnetic flux 824 flows through the rotor (for example, through the iron of the rotor) in a θ-z plane, and emerges from the north pole 816 of the array 814 of permanent magnets. While re-entering the stator pole 804 at another end, the magnetic flux 824 again crosses the airgap 832 to another end of the same stator pole 804 or a different stator pole 840. In one embodiment, the magnetic flux 824 crosses the airgap 832 to the magnetically conducting portion 806 at another end of the stator pole 804.

Figure 8:
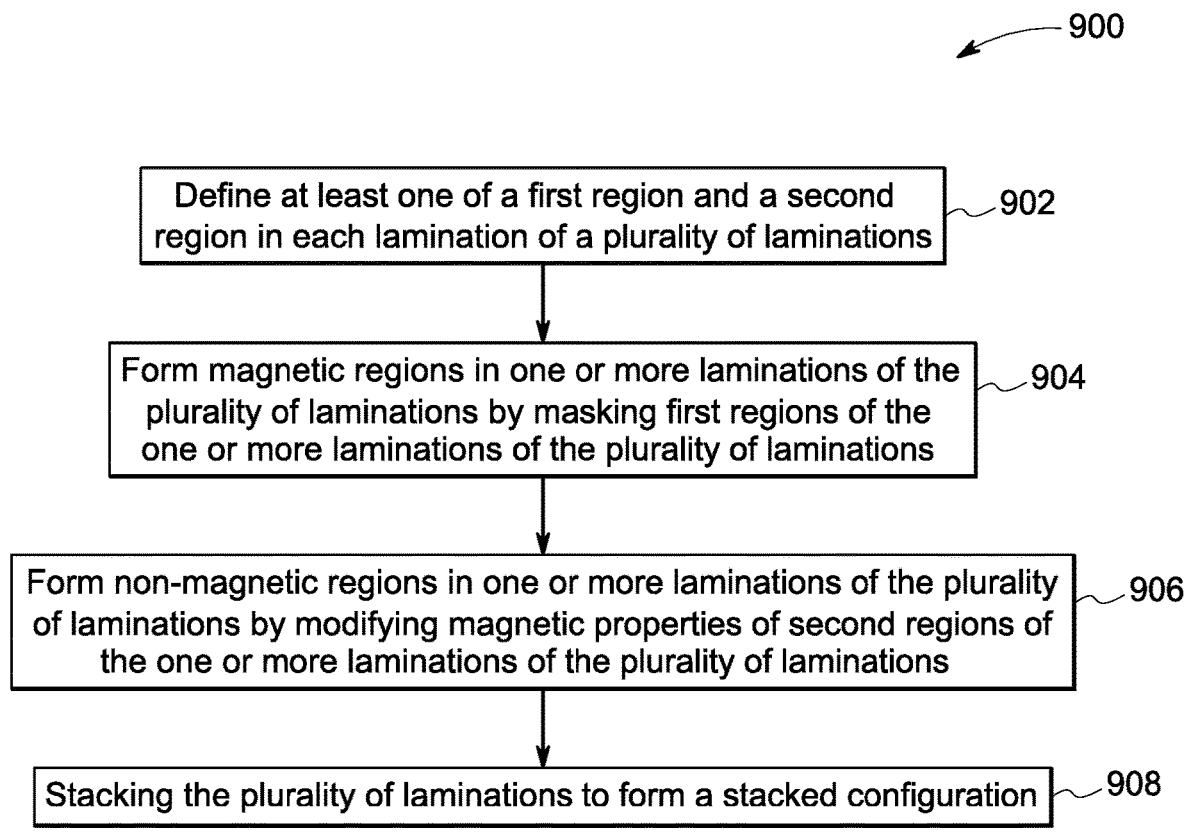
FIG. 8 is a flow chart representing an example method of manufacture of the core of the transverse flux machine, according to aspects of the present specification.

FIG. 8 is a flow chart 900 representing an exemplary method of manufacture of the transverse flux machine, according to aspects of the present specification. The method begins at block 902, where least one of a first region, such as the region 803 of FIG. 7, and a second region, such as the region 805 of FIG. 7, of each of the plurality of laminations, such as the laminations 802 of FIG. 7, are defined. The first and second regions represent magnetic and non-magnetic regions of the laminations. The first and second regions are designed such that the first and second regions of the laminations collectively define a magnetically conducting portion, such as the magnetically conducting portion 806 of FIG. 7, of a stator pole, such as the stator pole 804 of FIG. 7. The magnetically conducting portion provides a 3D space for the magnetic flux to flow.

Further, at block 904, magnetic regions in one or more laminations of the plurality of laminations are formed by masking first regions of the one or more laminations of the plurality of laminations to prevent demagnetization of the first regions. For each lamination, the first region is masked to avoid nitrogen diffusion in the first region. The diffusion of nitrogen into the first region may cause inadvertent demagnetization of the first region. In one embodiment, a mechanical mask or a nitrogen stop-off material is applied to the first region to avoid nitrogen diffusion. As used herein a "nitrogen stop-off material" is a material that is capable of substantially stopping the nitrogen from diffusing into the first region. It is not necessary that the nitrogen stop-off material itself contain nitrogen. In one example, the nitrogen stop-off material may include a polymer. Furthermore, depending on the shape and size of the first region, the mechanical mask may be of different shapes. The first region has magnetic properties and the relative permeability of the first region may be higher than a threshold value. Therefore, the first region may allow flow of magnetic flux.

Additionally, at block 906 non-magnetic regions in one or more laminations of the plurality of laminations are formed by modifying magnetic properties of second regions of the one or more laminations of the plurality of laminations. In particular, at block 906, magnetic material of the second regions of the one or more laminations is de-magnetized. In one embodiment, the second region is heat-treated in a nitrogen rich atmosphere at an elevated temperature, that is greater than about 900.degree Celsius, to demagnetize the material of the second regions. The process of heat treating the second regions of the laminations in the presence of nitrogen is referred to as nitriding. The process of nitriding may be carried out through a solid, liquid, gaseous, or plasma route. The elevated temperatures during the nitriding process allows for fast diffusion of nitrogen in the second region.

In one embodiment, the nitriding process aids in creating a partially magnetic region. The term 'partially magnetic region,' as used herein, may be used to refer to a region which has a relative permeability substantially lower than the relative permeability of the magnetic region but greater than the relative permeability of a non-magnetic region. Also, in one embodiment, while demagnetizing the second region, the nitrogen may diffuse into some interior regions of the lamination and particularly, slightly into the first region, which is originally masked at block 904. In one specific embodiment, the nitrogen may diffuse into about 200 micrometers of the first region from a boundary, such as the boundary 809 of FIG. 7, of the first and second regions.

Additionally, in one embodiment, both first and second regions have a concentration of carbon that is less than about 0.05 weight %. Specifically, in this embodiment, the first and second regions may be substantially free of carbon. Furthermore, the second region includes greater than about 0.4% weight of nitrogen. Since the second region includes greater than about 0.4% weight of nitrogen, the magnetic property of the second region may be modified and the second region may no longer allow flow of magnetic flux. Although in the example of FIG. 8 process of nitriding is employed to demagnetize the second region, use of other methods of demagnetization of the second region, such as carbiding, is also anticipated. The term 'carbiding,' as used herein refers to addition of a determine percentage of carbon in the second region to demagnetize the second region.

Furthermore, at block 908, the plurality of laminations is stacked together to form a stacked configuration such that the magnetic region and the non-magnetic region of laminations of the plurality of laminations form a portion of a 3D magnetic circuit, such as the 3D magnetic circuit 834 of FIG. 7. The stacked configuration is a stator pole. Furthermore, the stator pole is operatively coupled to a rotor and a stator coil.

The stacking of the plurality of laminations includes disposing one lamination of the plurality of laminations adjacent to other lamination of the plurality of laminations. Furthermore, one lamination of the plurality of laminations is disposed adjacent to other lamination of the plurality of laminations, such that the magnetic region and the non-magnetic region of laminations of the plurality of laminations aid in forming a magnetically conducting portion, such as the magnetically conducting portion 806 of FIG. 7, and a magnetically non-conducting portion, such as the magnetically non-conducting portion 808 of FIG. 7, respectively. In turn the shape of the magnetically conducting portion and the magnetically non-conducting portion aid in defining the 3D magnetic circuit 834. Additionally, the plurality of laminations is then coupled mechanically to operatively couple the plurality of laminations together.

Although the example of FIG. 8 describes the first and second regions of the laminations being defined and magnetic properties corresponding to the first and/or second regions of laminations being modified before stacking the laminations, in one embodiment, the magnetic property of the magnetically conducting portion and magnetically non-conducting portion, such as the magnetically conducting portion and magnetically non-conducting portions 806, 808 of FIG. 7 of stator pole 804 may be modified once the laminations are stacked together.

Furthermore, the foregoing examples, demonstrations, and process steps such as those that may be performed by the system may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, including but not limited to C++ or Java. Such code may be stored or adapted for storage on one or more tangible, machine readable media, such as on data repository chips, local or remote hard disks, optical disks (that is, CDs or DVDs), memory or other media, which may be accessed by a processor-based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in the data repository or memory.

Various embodiments of a transverse flux machine and a method of manufacturing of the transverse flux machine are presented. In accordance with aspects of the present specification, a stator pole of the transverse flux machine is made of plurality of laminations, where the laminations include a first and a second region. The shape of the first and second region of each of the laminations aid in forming a portion of a three-dimensional magnetic circuit of the transverse flux machine without using a complex manufacturing process or a complex design of the stator pole. The transverse flux machine as described hereinabove has enhanced structural stiffness and enhanced conduction of heat generated in the stator coils. Additionally, the transverse flux machine may find application in hybrid electrical vehicles and wind turbines.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

The invention claimed is:

1. A core of a transverse flux machine, comprising:
   a stator pole comprising:
   a plurality of laminations, wherein laminations of the plurality of laminations are in a stacked configuration, wherein each of the plurality of laminations comprises at least one of a magnetic region and a non-magnetic region, the non-magnetic regions of the plurality of laminations having a low relative permeability to inhibit flux flow therethrough, and wherein individual shapes of magnetic regions of the plurality of laminations are such that the magnetic regions of the plurality of laminations form at least a portion of a three-dimensional magnetic circuit.

2. The core of claim 1, wherein the plurality of laminations comprises similarly shaped laminations.

3. The core of claim 1, wherein each of the plurality of laminations comprises a connecting segment disposed between a pair of legs.

4. The core of claim 3, wherein each of the plurality of laminations comprises an opening disposed between the pairs of legs, wherein the opening is configured to receive at least a portion of a stator coil.

5. The core of claim 3, wherein the pair of legs are perpendicular to the connecting segment.

6. The core of claim 3, wherein the plurality of laminations comprises protruding portions.

7. The core of claim 1, wherein a shape of the magnetic region, the non-magnetic region, or both the magnetic and non-magnetic regions of at least one lamination of the plurality of laminations is substantially different from a shape of a magnetic region, a non-magnetic region, or both the magnetic and non-magnetic regions of other laminations of the plurality of laminations.

8. The core of claim 1, wherein laminations of the plurality of laminations have similar dimensions, shapes, and sizes, or combinations thereof.

9. The core of claim 1, wherein the plurality of laminations is substantially free of carbon.

10. The core of the transverse flux machine of claim 1, wherein non-magnetic regions of the plurality of laminations comprise greater than about 0.4% weight of nitrogen.

11. A transverse flux machine comprising:
    a rotor;
    a core comprising:
    a stator pole operatively coupled to the rotor, wherein the stator pole comprises:
    a plurality of laminations, wherein laminations of the plurality of laminations are in a stacked configuration, wherein each of the plurality of laminations comprises at least one of a magnetic region and a non-magnetic region, the non-magnetic regions of the plurality of laminations having a low relative permeability to inhibit flux flow therethrough, and wherein individual shapes of magnetic regions of the plurality of laminations are such that the magnetic regions of the plurality of laminations form at least a portion of a three-dimensional magnetic circuit; and
    a stator coil operatively coupled to the rotor and the stator pole.

12. The transverse flux machine of claim 11, wherein the rotor comprises a plurality of permanent magnets and a rotor yoke.

13. The transverse flux machine of claim 11, further comprising a support structure configured to provide support to the stator pole.

14. The transverse flux machine of claim 11, wherein a shape of the magnetic region, the non-magnetic region, or both the magnetic and non-magnetic regions of at least one lamination of the plurality of laminations is substantially different from a shape of a magnetic region, a non-magnetic region, or both the magnetic and non-magnetic regions of other laminations of the plurality of laminations.

15. The transverse flux machine of claim 11, wherein laminations of the plurality of laminations have similar dimensions, shapes, sizes, or combinations thereof.

16. The transverse flux machine of claim 15, wherein the plurality of laminations comprises C-shaped or U-shaped laminations.

* * * * *